United States Patent
Enrietti

(10) Patent No.: US 6,752,617 B1
(45) Date of Patent: Jun. 22, 2004

(54) UNIT FOR ACTUATING THE ROD OF A CLOSURE ELEMENT IN A MOULD FOR THE INJECTION-MOULDING OF PLASTICS MATERIALS

(75) Inventor: Piero Enrietti, Donnas (IT)

(73) Assignee: Thermoplay S.p.A., Pont Saint Martin (IT)

( * ) Notice: Subject to any disclaimer, the term of this patent is extended or adjusted under 35 U.S.C. 154(b) by 0 days.

(21) Appl. No.: 09/979,129
(22) PCT Filed: May 18, 2000
(86) PCT No.: PCT/EP00/04503
§ 371 (c)(1),
(2), (4) Date: Jan. 14, 2002
(87) PCT Pub. No.: WO00/71325
PCT Pub. Date: Nov. 30, 2000

(30) Foreign Application Priority Data

May 21, 1999 (IT) .......................... T099A0426

(51) Int. Cl.[7] .............................................. B29C 45/23
(52) U.S. Cl. ...................................... 425/564; 425/566
(58) Field of Search ................................ 425/562, 563, 425/564, 565, 566

(56) References Cited

U.S. PATENT DOCUMENTS

| | | | | |
|---|---|---|---|---|
| 4,380,426 A | * | 4/1983 | Wiles | 425/566 |
| 5,511,968 A | * | 4/1996 | Guzzini et al. | 425/564 |
| 5,894,025 A | * | 4/1999 | Lee et al. | 425/562 |

FOREIGN PATENT DOCUMENTS

| | | | |
|---|---|---|---|
| DE | 4300334 | * | 7/1993 |
| EP | 920970 | * | 6/1999 |
| WO | 98/56560 | * | 12/1998 |

* cited by examiner

Primary Examiner—Tim Heitbrink
(74) Attorney, Agent, or Firm—Sughrue Mion, PLLC

(57) ABSTRACT

The actuating unit comprises a piston element (21) slidable in a cylinder element (20) and connectable to a closure rod (16) slidable in an injection duct (14) between an extended position in which it blocks an injection hole (15) and an injection position in which it is retracted into the injection duct. The piston element (21) has an engaged seat (46, 47) which can house a head end portion (16a) of the rod (16). The engagement seat is shaped so as to allow the piston element (21) to be translated transversely relative to the axial direction of movement of the rod (16) in order to release the piston element (21) from the rod.

5 Claims, 4 Drawing Sheets

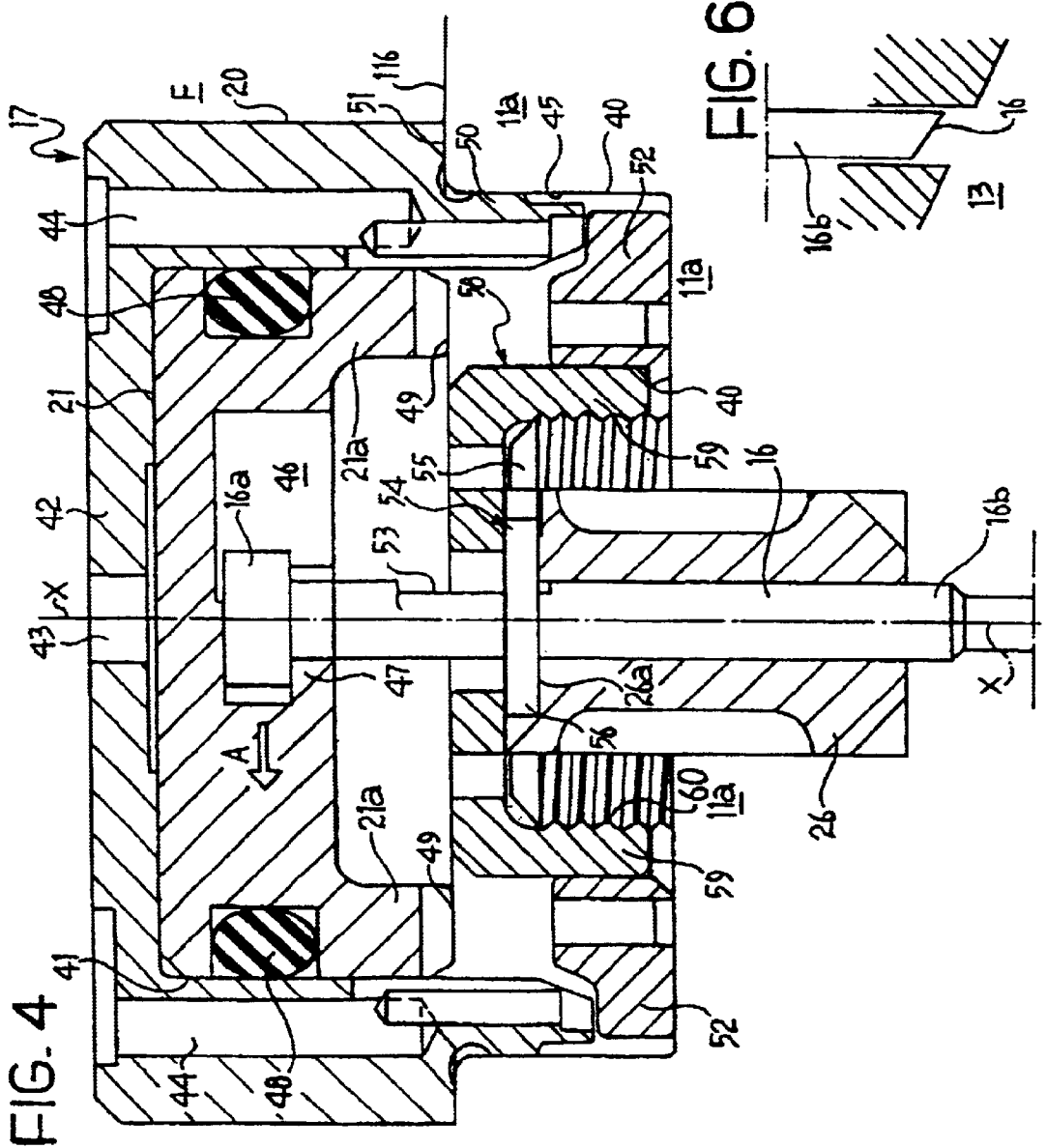

UNIT FOR ACTUATING THE ROD OF A CLOSURE ELEMENT IN A MOULD FOR THE INJECTION-MOULDING OF PLASTICS MATERIALS

This is a Nailkona Stage Entry under 37 C.F.R. § 371 of PCT/EP00/04503, with an international filing date of May 18, 2000, the complete disclosure of which is incorporated herein by reference.

BACKGROUND OF THE INVENTION

The present invention relates to a unit for actuating the rod of a closure element in a mould for the injection-moulding of plastics material.

An injection-moulding mould provided with a conventional actuating unit is shown in partial section in FIG. 1. A heated nozzle 10 is mounted beneath a heated plate 11 in order to receive the molten plastics material from a supply duct 12 and to inject it into a moulding cavity 13 through an injection duct 14 and a lower injection hole 15.

A closure rod 16 slides coaxially inside the injection duct 14, the axial position of the rod 16 being controlled by an upper actuating unit, generally indicated 17 and housed in a cavity 18 formed in an upper plate 19. The actuating unit 17, which is pneumatically operated, comprises a cylinder 20 in which a piston 21, to which the upper end 16a of the rod 16 is connected, can slide vertically.

The vertical movement of the piston 21 and of the rod 16 is brought about by sending an operating fluid (air) alternately through an inlet duct 22 and an inlet duct 23 which are formed in the upper plate 19 and communicate with the cavity 18 in upper and lower positions, respectively, in order to admit the operating fluid to the cylinder 20 through a duct 24 or a duct 25, so as to raise or lower the piston 21. As is known, in the lowered position (not shown), the lower end 16b of the rod 16 blocks the injection hole 15 whereas, in the raised position (as shown in FIG. 1), the injection hole is open to allow plastics material which is injected from the duct 14 of the nozzle 10 to pass through to the moulding cavity 13.

To prevent the injected material From reaching the actuating unit 17, a tempered steel sealing bush 26 is provided and is housed in a cavity 27 in the hot plate 11; the sealing bush 26 is fitted on the slidable rod 16. A reaction ring 28 is interposed between the hot plate 11 and the upper plate 19. A closure cover 29 is fixed to the upper plate 19 to restrain the actuating unit 17 at the top.

A conventional actuating unit of this type requires numerous seals; in addition to two seals 30 and 31 between the piston 21 and the cylinder 20, there is a seal 32 between the cover 29 and the upper plate 19, there are two seals 33 and 34 between the upper plate 19 and the stationary cylinder 20, and there is a further seal 36 mounted on an enlarged element 37 acting as a stop for the rod 16.

Injection moulds provided with actuating units configured as described above have a disadvantage of a practical nature when it is necessary to perform adjustment or maintenance operations on one or more closure rods, for example, when it is necessary to replace a worn rod or to clear an injection duct of accumulations of waste. For example, in order to gain access to an injection nozzle, it is necessary to remove the upper plate 19 and with it all of the closure units of the various injection nozzles of which there may be a considerable number (48 or more) in cases in which the mould comprises several nozzles and numerous moulding cavities. During the removal of the upper plate 19, all of the rods of the various closure units are thus removed.

Since an operation of this type is performed hot to enable the rods to be removed, the plastics material tends to rise through the sealing bushes 26 and thus to be deposited on surfaces which should, however, remain clean. Once the maintenance or adjustment operation has been performed on the nozzle or nozzles which required it, it is therefore necessary to clean the surfaces on which plastics material has been deposited during the operation, for all of the nozzles of the mould, before the upper plate with the respective rods and closure units is reassembled.

As will be understood, the removal of the upper plate, complete with closure units and rods, is a complex operation but, above all, careful cleaning at many points of the mould as referred to above requires long periods of inactivity of the apparatus and is therefore expensive.

SUMMARY OF THE INVENTION

Moreover, during the reassembly of the closure units, it is necessary to pay particular attention to the various seals, ensuring that they are positioned correctly before closing the mould again.

An object of the invention is to provide an actuating unit in which the piston can be released from its rod easily without requiring the latter to be removed from the nozzle.

An object of the present invention is to propose an actuating unit which is easy to install and to maintain, and which can prevent the problems of the prior art discussed above.

A further object of the present invention is to provide an actuating unit having an improved and simplified system for adjusting the travel of the closure rods; in particular, the adjustment of the travel and the removal of the rod of a particular actuating unit should be independent operations.

This further object is achieved, again according to the invention, by an actuating unit having the characteristics defined in claim 4.

Yet another object of the invention is to mould products which do not bear obvious marks on their surfaces in the regions of the injection points when these points lie on surfaces which are not perpendicular to the closure rod.

BRIEF DESCRIPTION OF THE DRAWINGS

Further important characteristics are claimed in the other dependent claims.

The characteristics and advantages of the invention will become clear from the detailed description of an embodiment thereof, given with reference to the appended drawings, provided by way of non-limiting example, in which:

FIG. 4 is a view showing the actuating unit of FIGS. 2 and 3, in section and on an enlarged scale, FIG. 5 is a plan view of a key element cooperating with the actuating unit of FIG. 4, and FIGS. 6 and 7 are schematic views showing the detail of two different embodiments of the lower end of a closure rod.

With reference to FIGS. 2, 3 and 4, and with the use of the same reference numerals as were used to indicate corresponding elements and parts already mentioned with reference to FIG. 1, an actuating unit 17 according to the present invention is mounted in a seat 40 formed in a hot plate 11.

Figure 1:
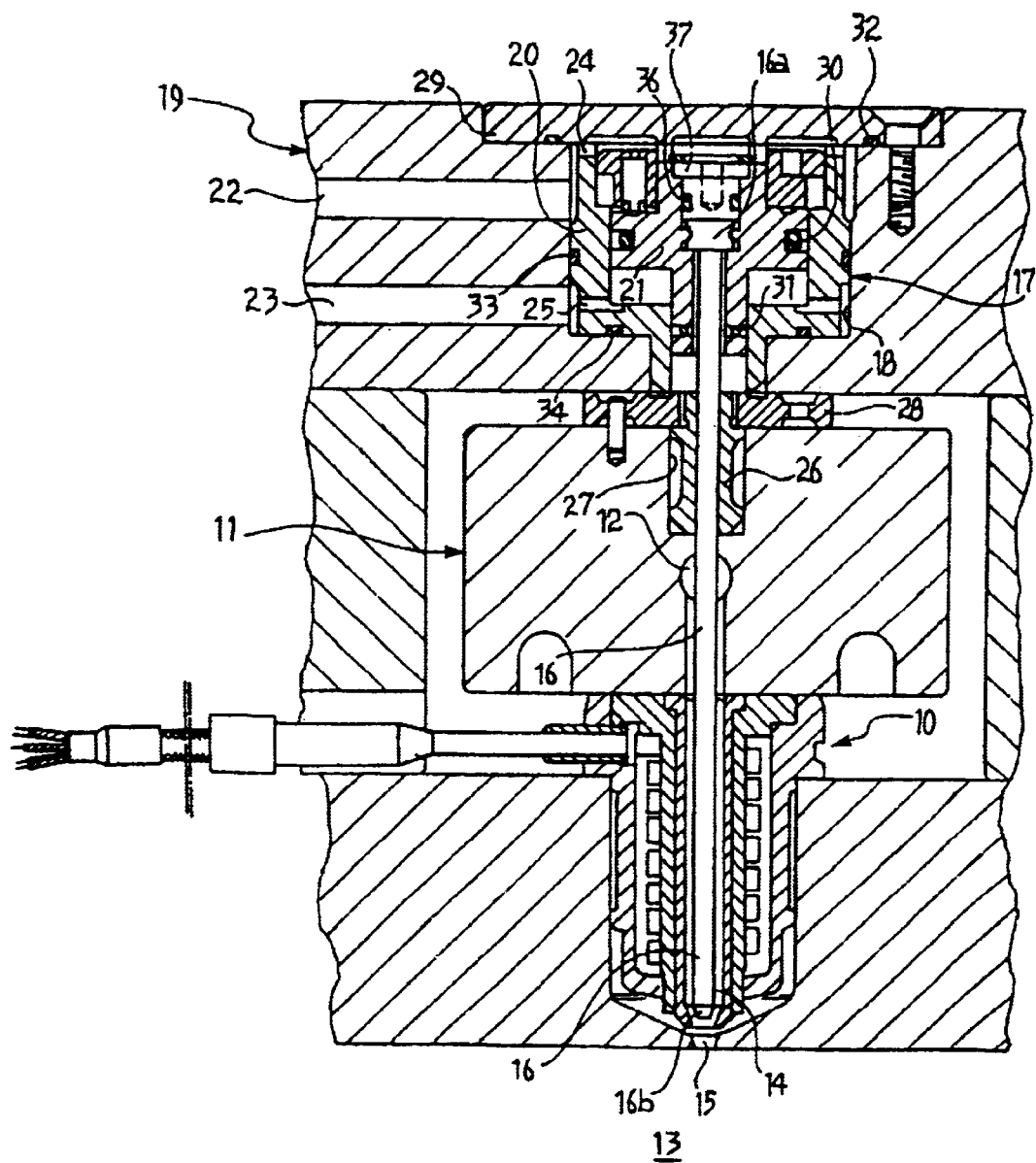
FIG. 1 is a schematic, vertical section through a conventional actuating unit.

The cylinder 20 is in the shape of an inverted cup with side walls 41 and an upper end 42 which is closed at the top by a top plate 19.

Ducts 22 and 23 are formed in the top plate 19 for providing a flow of operating air, into the cylinder 20 and causing, respectively, the lowering and the raising of the piston 21 which is slidable vertically in the cylinder 20. An opening 43 is formed in the upper end 42 of the cylinder in a substantially central position corresponding to the position of the inlet duct 22; ducts 44 formed in the side walls 41 of the cylinder put the inlet duct 23 into communication with the lower surfaces of the piston 21 in order to raise it. The side wall 41 of the cylinder forms a lower, cylindrical, annular appendix SO which is fitted in the seat 40 and is in close contact with the peripheral wall 45 thereof, and a radial surface 51 which can come into axial abutment with a radial surface 11b of the hot plate 11.

DETAILED DESCRIPTION OF THE INVENTION

The terms "lateral", "radial", and "axial" as used herein should be interpreted with reference to the longitudinal axis x of the rod 16, unless indicated otherwise.

The lower face of the piston 21 has a recess 46 forming, on one side, an undercut 47 of a size such as to house the enlarged head 16a of the rod 16 with predetermined minimal axial clearance. On the opposite side to the undercut 47, the recess 46 forms an empty space for allowing the piston to slide transversely relative to the rod when it is necessary to disconnect these two elements, as will be explained further below.

The outer and upper lateral portion of the piston 21 bears a seal 48 which performs sealing action against the inner surface of the side wall 41 of the cylinder 20. The piston 21 has a lower, outer, annular appendix 21a which terminates in a radial lower face 49. The lower end of stroke position of the piston 21, which corresponds to the position in which the injection hole 15 is blocked, is defined by the abutment of the lower face 49 of the piston against an annular element 52 of calibrated axial thickness, housed in the bottom of the seat 40 in the hot plate 11.

Again according to the invention, as shown more clearly in FIG. 4, a flat face 53, is formed on an upper portion of the rod 16, so that the rod is prevented from rotating about its own longitudinal axis, in order to keep the rod in a predetermined angular position. The flat face 53 cooperates with a key element 54, shown separately in FIG. 5, which is mounted so as to be prevented from rotating relative to the hot plate and bears on the upper face 26a of the bush 26. In the example shown, the key element 54 is fork-shaped and has, on one side, a radial appendix 55 which is locked rotationally by the hot plate, and on the, opposite side, a pair of opposed projections 56 between which an edge 57,which can act on the flat face 53 of the rod 16, is defined.

The key element 54 is restrained axially against the upper face 26a of the sealing bush 26 by means of an inverted cup-shaped ring nut 58 having a lower cylindrical portion 59 in which a thread 60 is formed for screwing the ring nut onto the hot plate 11.

The unit operates as follows.

Figure 2:
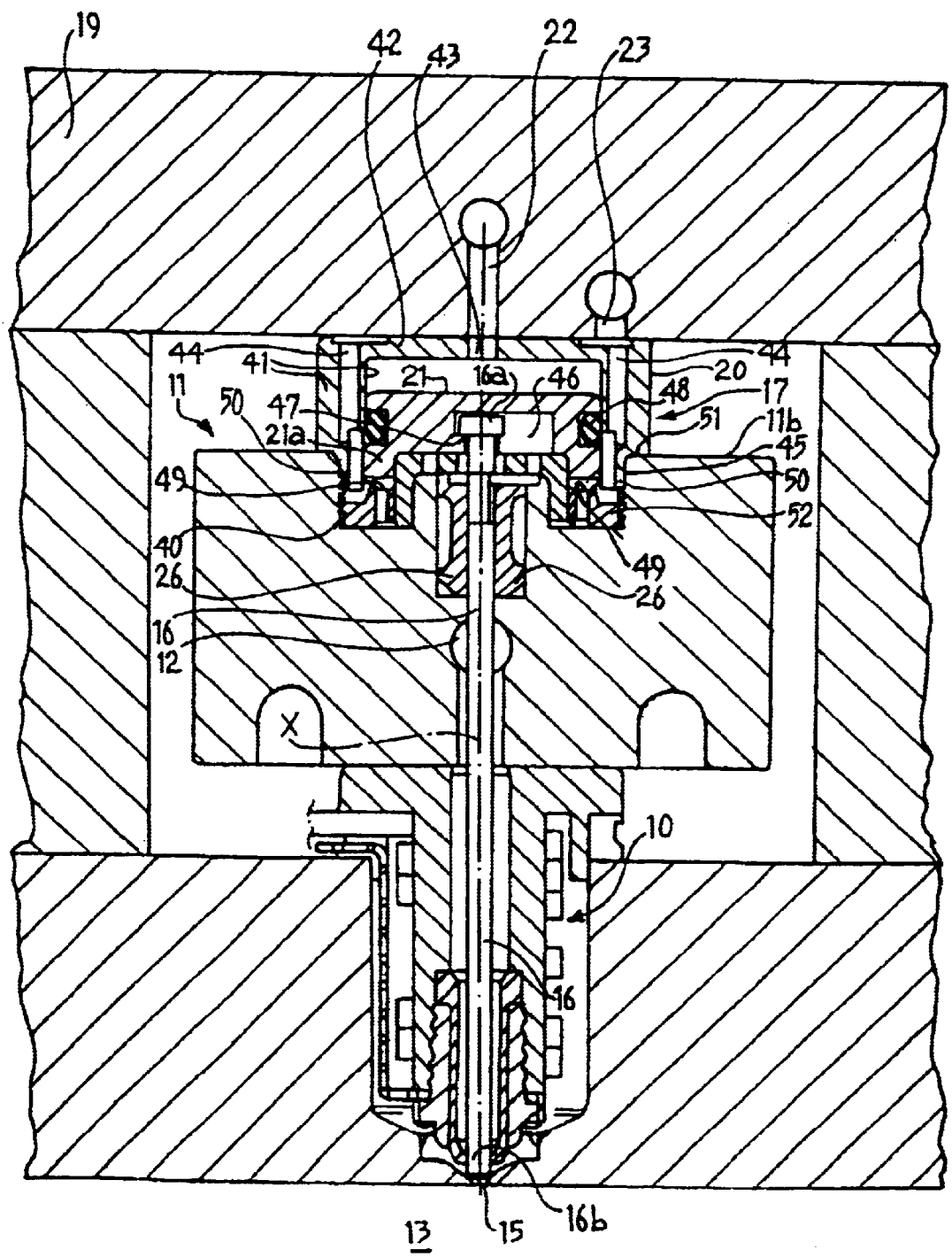
FIGS. 2 and 3 are schematic views showing, in section, a portion of an actuating unit according to the present invention in two opposite operative positions.
Figure 3:
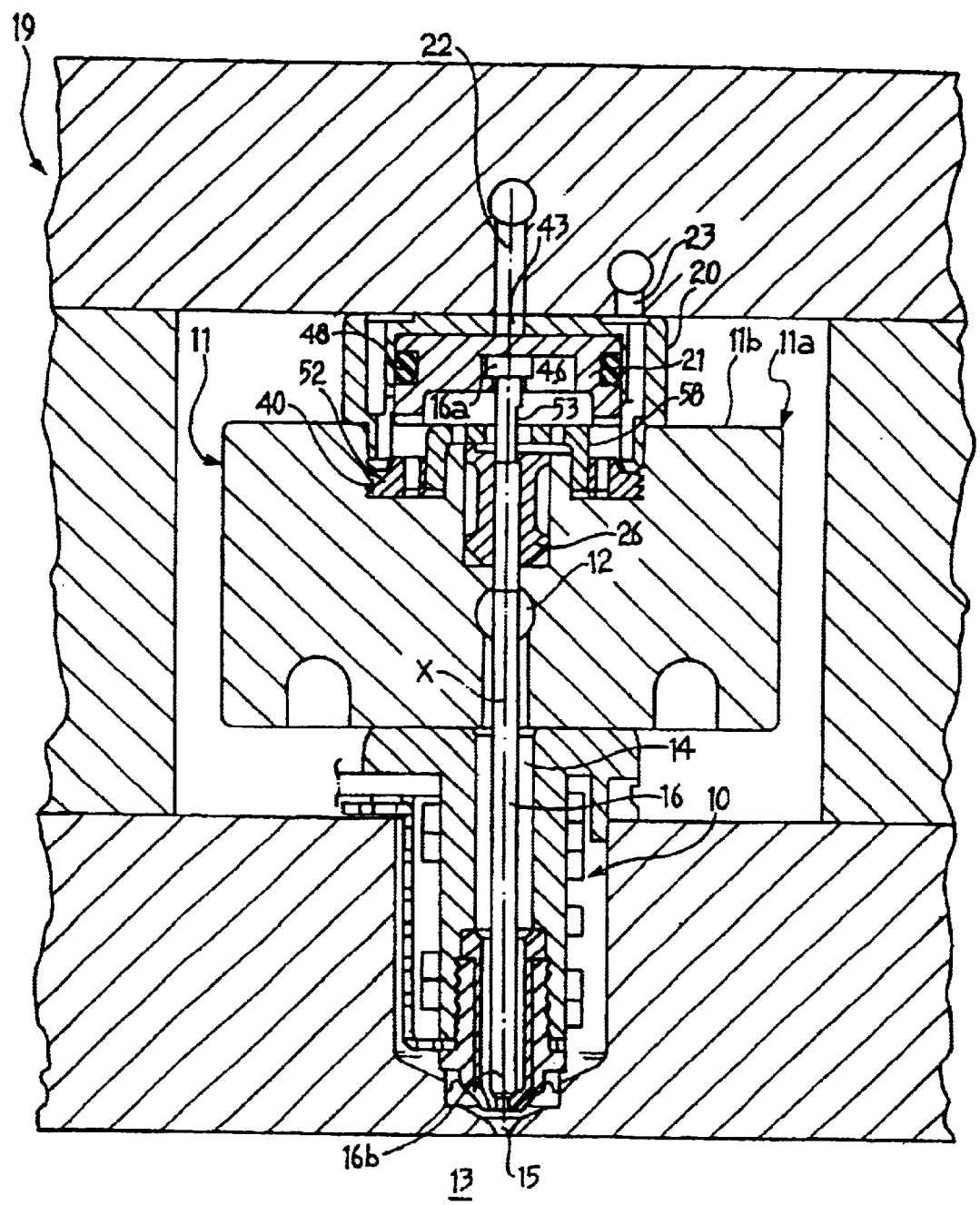

Plastics material is injected through the supply duct 12 and, at the same time, the piston 21 and the rod 16 are raised by the sending of air through the duct 23, to reach the configuration of FIG. 3. As the rod 16 is refracted upwards, it opens the injection hole 15. Once the moulding cavity 13 has been filled, injection is stopped by the sending of operating air through the duct 22, which results in lowering of the piston 21 and of the rod 16 the lower end of which closes the injection hole (FIG. 2).

When it is necessary to operate on a particular actuating unit, the piston 21 is first raised to its upper end of stroke position by the sending of air through the duct 23; the upper plate 19 is then removed from the hot plate 11 and it is possible to operate solely on the closure unit or units which require the operation, leaving the other closure units of the mould undisturbed. In order to gain access to the rod 16, the cylinder 20 is removed vertically from the seat 40 in the hot plate and the piston 21 is translated transversely in the direction indicated by the arrow A in FIG. 4, thus releasing the head of the rod 16. The ring nut 58 is then unscrewed and the key element 54 can be removed and the rod 16 taken out of the sealing bush 26 and the heated nozzle 10.

In order to adjust the axial travel of the rod 16 once the cylinder 20 and the piston 21 have been removed, the annular element 52 which defines this travel can be removed from the seat 40 and replaced by a similar, thicker or thinner element, or may be replaced in its seat after having been made thinner. As will be noted, when the operation does not require travel adjustment, once the actuating unit has been reassembled, the annular element 52 keeps the original travel of the rod unchanged without the need for any adjustment.

It will be appreciated that, in comparison with the prior art discussed in the introductory part of the description, with the present invention, the number of seals is reduced to a minimum; this speeds up reassembly operations which conventionally required particular care with regard to the repositioning of the seals which, if they were not correctly arranged, could in turn be the cause of a further and subsequent maintenance operation.

It will also be noted that, in order to remove the annular element 52, the piston can advantageously be removed without the need necessarily to remove the rod from the nozzle.

Above all, it will be appreciated that, by virtue of the present invention, before the unit on which an operation has been performed is reassembled, it is necessary to perform cleaning limited purely to the closure unit or units from which the rods have been removed, resulting in a considerable saving in time and costs.

The seat with the undercut which restrains the head of the rod axially on the piston ensures a precise and durable coupling which requires no maintenance and which, unlike the threaded couplings which are used conventionally, ensures perfect verticality of the rod.

Finally, the maintenance of a given angular orientation by the above-described key configuration is particularly useful when the surface of the moulding cavity in the region of the injection hole is curved or inclined relative to the plane passing through the hole. To prevent a visible mark remaining on the moulded product at this point, the lower end 16b of the rod 16 may have an end surface 16c which is shaped so as to be level with the surface of the mould cavity, for example, so as to be inclined as in FIG. 6 or curved as in FIG. 7. In cases such as these, the key enables the orientation of the rod 16 to be maintained.

Naturally, the principle of the invention remaining the same, the forms of embodiment and details of construction may be varied widely with respect to those described and illustrated purely by way of non-limiting example, without departing from the scope of the invention as defined in the appended claims.

What is claimed is:

1. An actuation unit for actuating the rod of a closure element in a mould for the injection-moulding of plastics materials, the unit comprising a piston element (21) slidable in a cylinder element (20) and connectable to a closure rod (16) slidable in an injection duct (14) between an extended position in which it blocks an injection hole (15) and an injection position in which it is retracted into the injection duct, wherein the piston element (21) has an engagement seat (46, 47) for housing a head end portion (16a) of the rod (16), the engagement seat being shaped in a manner such as to allow the piston element (21) to be translated transversely relative to the axial direction of movement of the rod (16) to release the piston element from the rod, wherein the actuating unit is mounted on the hot plate (11) of a mould in a position interposed between the hot plate (11) and an upper plate (19) so as to be accessible after the removal of the upper plate (19) from the hot plate (11) and to be removable from the mould independently of the other closure units.

2. An actuating unit according to claim 1, characterized in that the actuating unit further comprises a removable element (52) of calibrated axial thickness which can be interposed axially between the piston element (21) and the hot plate (11) and which forms an abutment surface for the piston element (21) in its end of stroke position which corresponds to the condition in which the injection hole (15) is blocked.

3. An actuation unit for actuating the rod of a closure element in a mould for the injection-moulding of plastics materials, the unit comprising a piston element (21) slidable in a cylinder element (20) and connectable to a closure rod (16) slidable in an injection duct (14) between an extended position in which it blocks an injection hole (15) and an injection position in which it is retracted into the injection duct, wherein the piston element (21) has an engagement seat (46,47) for housing a head end portion (16a) of the rod (16), the engagement seat being shaped in a manner such as to allow the piston element (21) be translated transversely relative to the axial direction of movement of the rod (16) to release the piston element from the rod, wherein the actuating unit is associated with an engagement means (54) which is prevented from rotating and which has a shape at least partly corresponding to that of a portion (53) of the rod (16) having a non-circular cross-section, so as to prevent the rod from rotating about its own longitudinal axis, wherein the engagement means (54) which is prevented from rotating is mounted releasbly (58) on the hot plate.

4. An actuating unit according to claim 2, characterized in that the piston element has a generally inverted cup shape having, centrally, the engagement seat (46, 47) for the head (16a) of the rod (16) and, externally, an annular appendix (21a) with an end surface (49) which can come into abutment with the removable element (52) of calibrated axial thickness.

5. An actuation unit for actuating the rod of a closure element in a mould for the injection-moulding of plastics materials, the unit comprising a piston element (21) slidable in a cylinder element (20) and connectable to a closure rod (16) slidable in an injection duct (14) between an extended position in which it blocks an injection hole (15) and an injection position in which it is retracted in the injection duct, wherein the piston element (21) has an engagement seat (46, 47) for housing a head end portion (16a) of the rod (16), the engagement seat being shaped in a manner such as to allow the piston element (21) to be translated transversely relative to the axial direction of movement of the rod (16) to release the piston element from the rod, wherein the cylinder element (20) has a generally inverted cup shape such that the cylinder element can be clamped between the hot plate (11) and the upper plate (19), the cylinder element (20) having a side wall (41) with a surface (51) for abutment against a radial surface (11b) of the hot plate (11), and an upper end (42) which has a surface for abutment against the upper plate (19).

* * * * *